(No Model.)

L. A. PALMAR.
SEPARATOR.

No. 407,235. Patented July 16, 1889.

WITNESSES:
F. G. Fischer
A. A. Higdon

INVENTOR
Lansing A. Palmar
By J. A. Higdon
his Attorney.

UNITED STATES PATENT OFFICE.

LANSING A. PALMAR, OF KANSAS CITY, MISSOURI.

SEPARATOR.

SPECIFICATION forming part of Letters Patent No. 407,235, dated July 16, 1889.

Application filed April 23, 1889. Serial No. 308,287. (No model.)

*To all whom it may concern:*

Be it known that I, LANSING A. PALMAR, of Kansas City, Jackson county, Missouri, have invented certain new and useful Improvements in Steam-Separators, of which the following is a full, clear, and exact description, reference being had to the accompanying drawings, forming a part hereof.

This invention relates to certain improvements in steam-separators, having for its object to feed the steam in a perfectly dry or highly expansive condition to the engine; and to these ends the nature of the invention consists of the novel combination of parts and their construction, as will fully appear from the following description and accompanying illustrations, in which—

Figure 1:
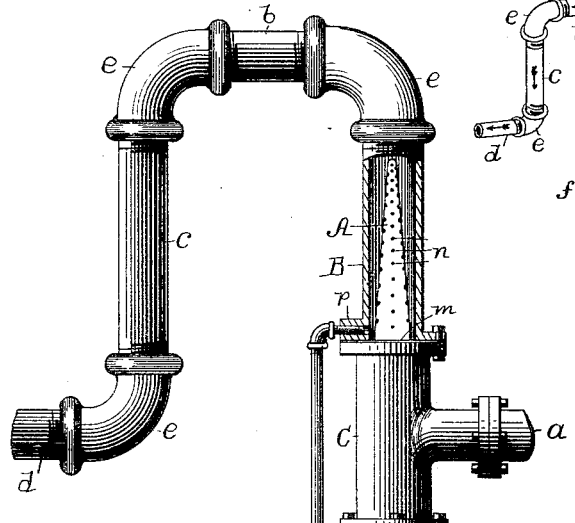
Figure 2:
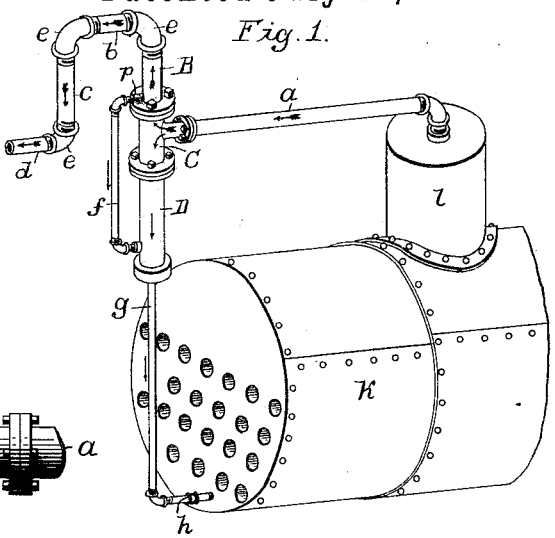
Figure 2:
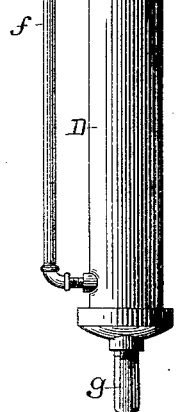
Figure 3:
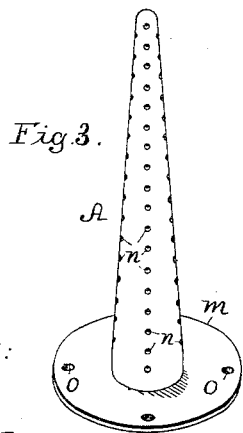
Figure 4:
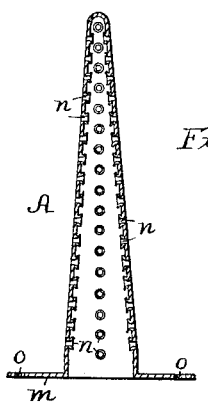

Figure 1 is a perspective view of a boiler having my invention applied thereto. Fig. 2 is a greatly enlarged detailed side view, partly broken away and in section, of my invention. Figs. 3 and 4 are a detailed perspective view and a detailed sectional view of the perforated cone.

In the embodiment of my invention I employ an upright cylindric chamber D, which connects by a pipe $g$ with the water-chamber of the boiler K.

C is a T-shaped pipe, the horizontal arm or section $a$ of which connects with the steam-dome $l$ of the boiler K, while the vertical arm or section C is bolted upon the chamber D and is of greater diameter than the arm or section $a$ to promote the separation of the water and steam, the water passing downward into the chamber D and the steam passing upward.

B is another pipe-section bolted upon the vertical arm or section C of the T-shaped pipe, and containing a perforated cone-pipe A, the base $m$ of which is bolted to the upper end or top of the arm or section, the same bolts connecting the pipe-sections B C together, passing through the apertures $o$ in said base. This cone has the effect to still further promote the separation of the water and steam, the steam passing through the apertures thereof, while the water passes down along the inner sides of the cone and drains off below.

The perforations or apertures $n$ of the cone-pipe A are formed or punched through the same by a suitable implement, so as to cause the displaced metal to form inward and flared flanges around said apertures or perforations to draw off the water around the same. The water carried through the perforations of the cone-pipe with the steam passes down into the bottom of the pipe-section B, containing said cone-pipe, and is carried off through the drain-pipe $f$, connecting the bottom of said pipe-section with the bottom of the chamber D. The pipe-section B is connected with the steam-pipe $d$, leading to the engine, by means of the elbows $e\ e$ and intermediate short pipe-sections $b\ c$. The pipe $g$ has, near the boiler, a check-valve or cut-off, which is brought into requisition in case of accident to the separator.

From the foregoing it will be seen that the steam is fed to the engine in a perfectly dry and highly expansive or elastic condition.

It will also be observed that my invention can be readily attached to boilers in any required position, according as circumstances may demand, and is applicable to all classes of stationary and marine steam-boilers.

Having thus fully described my invention, what I claim as new, and desire to secure by Letters Patent, is—

1. The separating-cone constructed of sheet metal, having apertures $n$ punched inwardly through its body and provided with flange $m$ at its base, in combination with an inclosing-chamber and connections, the flange $m$ being clamped upon one end of said inclosing-chamber to hold the cone in position, substantially as and for the purpose set forth.

2. In a separator, the combination of an inclosing-chamber provided with a steam-supply connection with a boiler, a perforated separating device inclosed within said chamber, and the drain-pipe $f$, located on the exterior of the inclosing-chamber and connecting the space in the upper portion of the inclosing-chamber with the bottom thereof, substantially as set forth.

3. The steam-separator having a T-shaped pipe-connection and a perforated cone-pipe arranged in a pipe-section superposed upon the vertical arm of said T-shaped pipe-connection, substantially as set forth.

4. The steam-separator comprising the T-shaped pipe-connection, whose pipe-sections are of varying diameters, the receiving-chamber D, the cone-pipe chamber superposed upon the upper arm or section of the T-shaped pipe-connection and containing the perforated cone-pipe, the pipe or chamber D, connected to the lower end of the vertical arm or section of said T-pipe connection, and the drain-pipes, one connecting with the base of the cone-pipe chamber and with the bottom of the chamber D and the other connecting with the bottom of the latter chamber D and with the water-chamber of the boiler, substantially as set forth.

In testimony whereof I affix my signature in presence of two witnesses.

LANSING A. PALMAR.

Witnesses:
F. G. FISCHER,
A. A. HIGDON.